Aug. 7, 1923.
P. G. ROSS
CONTAINER
Filed Sept. 16, 1921
1,464,395
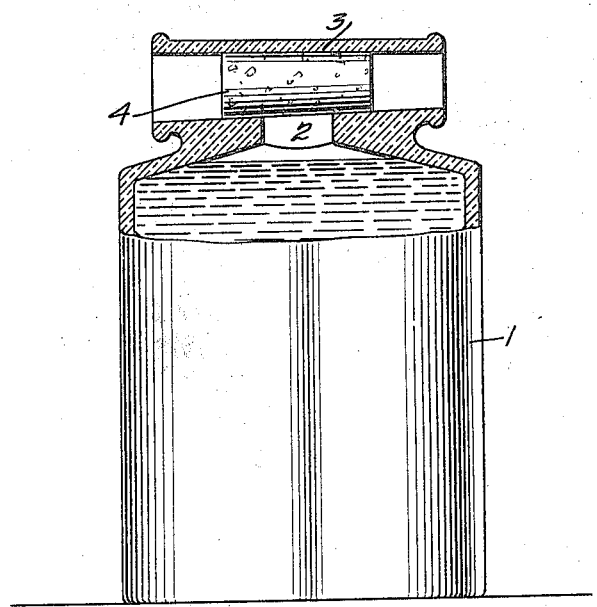
Fig.1,
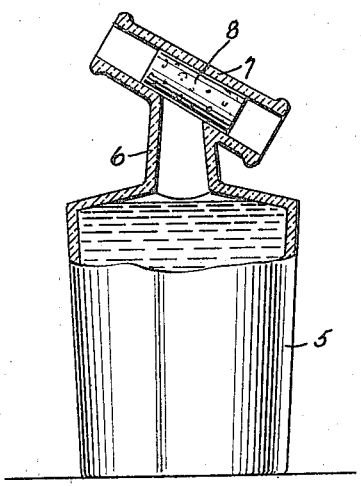
Fig.2,
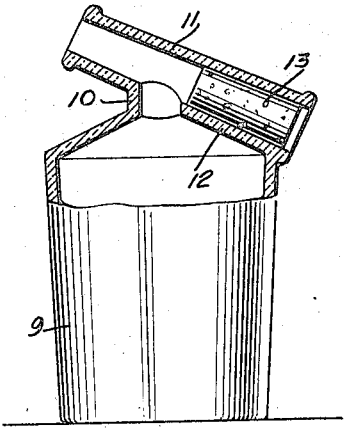
Fig.3.
WITNESSES
Edw. Thorpe
F. J. Foster
INVENTOR
Paul G. Ross
BY
ATTORNEYS Patented Aug. 7, 1923.

1,464,395

UNITED STATES PATENT OFFICE.

PAUL G. ROSS, OF POULTNEY, VERMONT.

CONTAINER.

Application filed September 16, 1921. Serial No. 501,112.

*To all whom it may concern:*

Be it known that I, PAUL G. Ross, a citizen of the United States, and a resident of Poultney, in the county of Rutland and State of Vermont, have invented a new and Improved Container, of which the following is a full, clear, and exact description.

This invention relates to improvements in containers, particularly to liquid containers, and the object of the invention being to provide a container so constructed that there is no danger of pressure from the inside of the container blowing out a cork or other closure.

Another object is to provide a container so constructed that a cork may be readily removed therefrom without danger of injuring the cork.

A further object is to provide a device of this character which will be simple and practical in construction, efficient in use, and comparatively inexpensive to manufacture.

In the accompanying drawings—

Figure 1 is a view partly in section and partly in side elevation showing a container embodying my invention;

Figure 2 is a similar view on a reduced scale showing a slightly modified form of container; and Figure 3 is a view similar to Figure 2 illustrating still another modification.

Referring in detail to Fig. 1 of the drawings, it will be seen that I provide a container, preferably in the form of a bottle or jar, which includes a body portion 1 and a relatively short neck 2 at the upper end of the body portion. A pouring spout 3, of tapered cylindrical shape, extends in a transverse plane to the neck and communicates at its intermediate portion with the neck. This pouring spout preferably forms an integral part of the container and includes a pair of open ends. A cork 4 may be inserted in the pouring spout to close the neck of the bottle, and it will be apparent that pressure from within the bottle produces only a lateral strain on the cork, so that there is no danger of the cork blowing out.

In Fig. 2, I have illustrated a slightly modified form of container which comprises a body portion 5, a relatively long neck 6, and a tapered cylindrical open-ended pouring spout 7 extending at an angle to the plane of the neck and communicating at its intermediate portion therewith. This pouring spout also forms an integral part of the container, and a cork 8 inserted in the pouring spout is used to seal the neck of the bottle.

In Fig. 3, I have shown substantially the same construction as that illustrated in Fig. 2 except that the bottle 9 is provided with relatively short neck 10 and a pouring spout 11, which communicates at its intermediate portion with the neck, is located at an angle to the neck, its lower wider end being integral with a shoulder 12 defining one wall of the container. The other end of the pouring spout projects upwardly at an angle from the neck. A cork 13 is used to close the neck of the bottle.

In all of the forms of the invention illustrated, it will be noted that pressure from within the bottle causes only a lateral strain on the cork. For filling or pouring from the pouring spout, the cork is inserted in one end of the spout, as seen in Fig. 3, so that the bottle may be readily filled or emptied without danger of the fluid running through the entire length of the spout.

It is obvious that the bottles, jars or other containers which embody my invention may be made of any suitable material and may vary infinitely in shape without departing from the invention.

Although I have illustrated certain preferred embodiments of the container, it will be apparent that various slight changes and alterations might be made in the general form of the parts described without departing from my invention, and, hence, I do not limit myself to the precise details set forth but consider myself at liberty to make such slight changes and alterations as fairly fall within the spirit and scope of the appended claim.

I claim:

As a new article of manufacture, a receptacle having an opening in its top, and an open ended pouring spout extending transversely of the receptacle over the opening thereof and on opposite sides of the opening and communicating at about its center of length with said opening, said spout being open at both ends and having a smooth unobstructed tapering passage and of a length to wholly house a cork in both its open and closed position, whereby the cork will be at all times concealed in the spout and can be moved back and forth therein to open and close the opening of the receptacle, so as to permit a portion of the contents of the receptacle to be poured out and the receptacle again closed.

PAUL G. ROSS.